United States Patent [19]
Gray et al.

[11] Patent Number: 6,046,255
[45] Date of Patent: Apr. 4, 2000

[54] FOAM AND FOAM/CEMENT MIXTURE

[75] Inventors: Paul T. Gray, 97 Calle Aragon, #G; David R. Masters, 550 Via Estrada, Unit H, both of Laguna Hills, Calif. 92653

[73] Assignees: Paul T. Gray; David R. Masters, both of Laguna Hills, Calif.

[21] Appl. No.: 09/020,773

[22] Filed: Feb. 9, 1998

Related U.S. Application Data

[63] Continuation-in-part of application No. 08/877,539, Jun. 17, 1997, abandoned, which is a continuation-in-part of application No. 07/782,409, Jan. 14, 1997, Pat. No. 5,900,191.

[51] Int. Cl.[7] .................................................. C08J 9/32
[52] U.S. Cl. .................................. 523/218; 261/DIG. 26
[58] Field of Search ........................... 261/76, 78.2, 18.1, 261/59, DIG. 26, DIG. 39; 523/218

[56] References Cited

U.S. PATENT DOCUMENTS

| | | | |
|---|---|---|---|
| 1,756,789 | 4/1930 | Hinton | 106/682 |
| 1,882,810 | 10/1932 | Greider | 106/682 X |
| 2,432,971 | 12/1947 | Ruthman et al. | 106/674 |
| 2,549,507 | 4/1951 | Morgan et al. | 166/293 |
| 2,600,018 | 6/1952 | Nelson et al. | 106/730 |
| 2,629,667 | 2/1953 | Kaveler | 106/720 |
| 2,700,615 | 1/1955 | Heijmer | 106/197.01 |
| 2,820,713 | 1/1958 | Wagner | 106/642 |
| 2,959,489 | 11/1960 | Wagner | 106/727 |
| 3,030,258 | 4/1962 | Wagner | 156/71 |
| 3,169,877 | 2/1965 | Bartoli et al. | 106/730 |
| 3,215,549 | 11/1965 | Ericson | 106/694 |
| 3,758,319 | 9/1973 | Ergene | 523/218 |
| 4,328,178 | 5/1982 | Kossatz | 366/2 X |
| 4,415,366 | 11/1983 | Copening | 106/86 |
| 4,789,244 | 12/1988 | Dunton et al. | 366/12 |
| 4,905,439 | 3/1990 | Filteau | 52/309.12 |
| 5,900,191 | 5/1999 | Gray et al. | 261/59 |

FOREIGN PATENT DOCUMENTS

WO 89/00153  1/1989  WIPO.

OTHER PUBLICATIONS

Southworth, G.B., "Admixtures for Concrete: What They Offer," *Construction Specifier*, Dec. 1966, Construction Specifications Institute.

"Chapter 5: Water–Reducing and Set–Controlling Admixtures," *Guide for Use of Admixtures in Concrete*, ACI Committee Report, Title No. 68–56, American Concrete Institute, 1971, pp. 14–17.

Gutmann, P., "Customizing Concrete Performance to Jobsite Needs," *Concrete Construction*, Jun. 1979, pp. 383–386.

"Cellular Concrete," Purdue University, 1985, pp. 1–14, 26, 32–39, and 48–52.

Gray, P.T., "The Stable–Air", *Concrete Construction*, Feb./Mar. 1988.

Guennewig, T., "Cost–Effective Use of Superplasticizers," *Concrete International*, American Concrete Institute, Mar. 1988.

"Standard Specification for Chemical Admixtures for Concrete," *Annual Book of ASTM Standards*, American Society for Testing and Materials, Aug. 1990, pp. 1–9.

Mielenz, R., "Chemical and Air–Entraining Admixtures for Concrete," date unknown, pp. 1–5.

"Set Retarding and Water Reducing Admixtures for Concrete," *Concrete Topics*, Kaiser Cement, Technical Service Department Bulletin 45, date unknown.

Gray ('87), Paul; "Using Preformed Foam As A Concrete Admixture"; *Concrete Construction*, Dec., 1987.

*Primary Examiner*—Richard L. Chiesa
*Attorney, Agent, or Firm*—Brown, Martin, Haller & McClain, LLP

[57] ABSTRACT

A foam of very small, microscopic bubbles of surfactant, each bubble containing a small quantity of water, is mixed with a water/cement mixture having a water to cement ratio of less than 0.33. The small bubbles have a ball bearing effect on the smaller cement and sand particles, increasing plasticity or flowability and thus reducing the water requirements of the mixture. The foamed cement mixture is laid to form a desired concrete structure, and the bubbles disintegrate or transform to leave voids of similar size uniformly dispersed throughout the concrete structure.

8 Claims, 3 Drawing Sheets

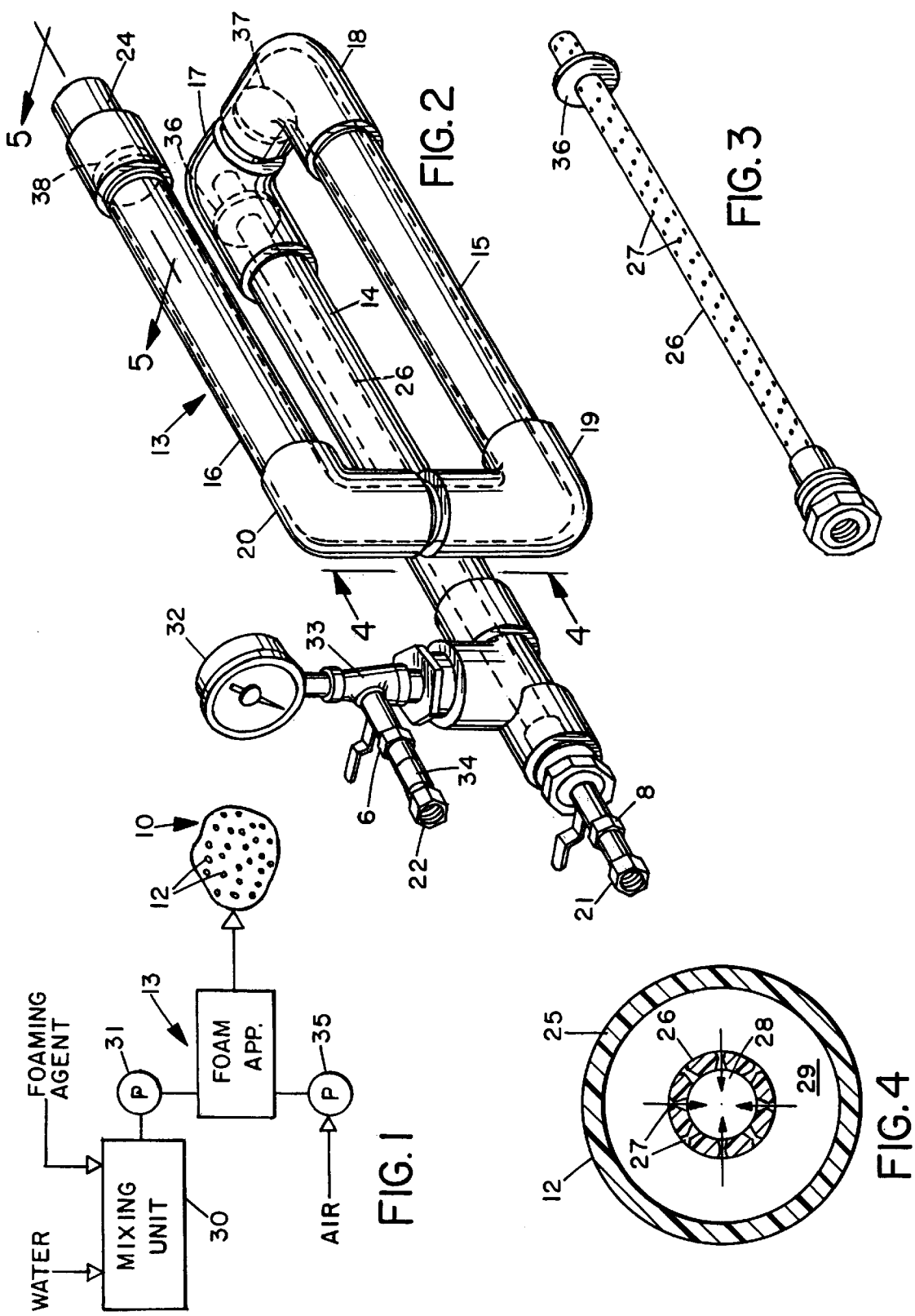

FOAM AND FOAM/CEMENT MIXTURE

CROSS-REFERENCES TO RELATED APPLICATIONS

This application is a Continuation-In-Part of application Ser. No. 08/877,539 filed Jun. 17, 1997, abandoned which was a Continuation-In-Part of application Ser. No. 08/782,409 filed Jan. 14, 1997, now U.S. Pat. No. 5,900,191.

BACKGROUND OF THE INVENTION

The present invention relates generally to cellular, foamed or air-entrained concrete, or concrete containing air cells or voids throughout its volume, and particularly to improved foam and foam/cement mixtures for making cellular concrete.

There have been ongoing efforts over the last fifty years to produce stronger, more durable concrete with improved properties. Water is normally mixed with cement and aggregates to produce a flowable concrete mixture which can be properly extended and shaped prior to setting. However, the water to cement ratio is critical in determining the strength of the hardened concrete, with a lower water content producing stronger concrete. Simply reducing the water content is not possible, since the concrete mixture will no longer be readily workable.

Various proposals have been made in the past to reduce the water to cement ratio in making concrete. The main technique currently used is the use of superplasticizers or chemical agents to reduce the water to cement (w/c) ratio. This chemical method can generally reduce the water requirements of a concrete mix by 10% to 30%. There are three basic types of superplasticizer. The first type are anionic materials which create negative charges on cement particles, causing them to repel each other, thereby reducing surface friction and making the mixture more workable at lower water concentrations. These materials have no effect on the hydration process. Because of the short workability time of such materials, they normally must be added at the job site.

The second type of superplasticizers are materials designed to coat the cement particles. These materials both improve plasticity of the cement paste, thus allowing a lower water content, and also control the hydration process. This enables such materials to be used at higher concrete temperatures, often reducing or eliminating the need for ice.

The third generation or type of superplasticizers are also designed to coat the cement particles, but also can maintain initial setting characteristics similar to normal concrete while producing a highly plastic mix at a very low water to cement ratio. These materials may be batch plant added and controlled.

Although water reducing superplasticizers do increase plasticity of the concrete mixture, as well as allowing the water to cement ratio to be reduced, they are subject to some disadvantages. Superplasticizers typically allow a reduction to about 0.40 in the water to cement ratio, and provide a corresponding increase in concrete strength, at 100 psi for each 0.01 decrease in water to cement (w/c) ratio. However, some superplasticizers tend to retard the set of the concrete. Additionally, superplasticizers in general produce increased segregation, particularly when sand gradation is poor, and undermine the quality of air entrapment. Superplasticizers also tend to cause more pronounced bleeding, and thus more capillaries, and produce concrete with decreased resistance to water absorption.

Cellular concrete also has the potential for reducing water content in cement mixes. However, up to now it has not been possible to achieve this objective to any extent, due to the problems in producing a sufficiently durable bubble in the cement mix. Thus, although it has been known for some time that bubbles introduced into a cement mix can form small air cells in the concrete, the fragile nature of the bubbles has necessitated introduction of the bubbles at the job site and also limited the volume of concrete that can be effectively replaced by air cells.

If the foam is injected into concrete in a concrete mixer, the bubbles will often have insufficient strength to withstand mixing for several hours during transportation to a construction site. If the bubbles break, water contained in the bubbles will mix in with the concrete, altering the concrete consistency and producing undesirable mix properties, such as high slump. Additionally, the known foam generating devices typically produce foams which contain too much water. Thus, the prior art foams, when mixed with concrete, produce bubbles which break too easily, either during mixing or working of the concrete as it is transported, or during placing and finishing of the concrete. Thus, previous attempts to produce lighter weight high strength concrete structures have been unsuccessful due to breaking and coalescing of the bubbles which have produced cellular concretes with less controllable air content and workability at desired slump.

Thus, up to now, it has not been possible to produce a foam which is sufficiently stable to withstand the effects of mixing of concrete for extended periods of several hours or more during transportation and subsequent agitation of the concrete as it is placed and finished, without collapse of a substantial portion of the bubbles mixed with the concrete. Further, it has not been possible to produce a cement and foam mixture with significantly lower w/c ratio and high strength.

SUMMARY OF THE INVENTION

It is an object of the present invention to provide a new and improved foam material for entraining in a cement mixture which is more resistant to collapse and thus produces a higher air cell density than was possible in the past.

It is a further object of the present invention to provide a new and improved cement mixture with a reduced w/c ratio, without requiring the addition of chemical additives such as superplasticizers.

It is another object of the present invention to produce an air-entrained concrete structure with reduced air cell size and higher strength than in the prior art.

According to one aspect of the present invention, a foam for mixing with cement is provided, which comprises a plurality of small bubbles of water and a foaming agent in predetermined proportions, a major portion of the bubbles having a diameter in the range from 0.001" to 0.008", the bubbles having a cell wall of sufficient strength to resist collapse when mixed with liquid cement, whereby entrained air cells are produced which result in voids in a subsequently cured concrete product.

In a preferred embodiment of the invention, the bubble size is in the range from 0.001" to 0.004", and the small bubbles forming the foam, if mixed with cement immediately, act as ball bearings to liquefy dry cement particles and reduce the required water to cement (w/c) ratio considerably while increasing flowability.

The bubbles are substantially smaller in size than the bubble size previously used in such foams for mixing with cement, and thus are stronger and more resistant to collapse. Any suitable foaming agent or surfactant may be used, such as the foaming agent sold under the trademark MEARL FOAM™ made by Mearl Corporation of Roselle Park, N.J., the foaming agent sold under the trademark CELLU-FOAM® made by Cellufoam Corporation of Ontario, Canada, the expansion material sold under the trademark ELASTIZELL® made by Elastizell Corp. of Ann Arbor, Mich., the foaming agent sold under the trademark CEL-LUCON® made by Romaroda Chemicals Pty. Ltd. of Victoria, Australia, and the foaming agent sold under the trademark LITE-CRETE™, made by Lite-Crete Inc. of Fresno, Calif.

According to another aspect of the present invention, a cement mixture is provided which comprises a slurry of liquid cement mixed with a foam of small bubbles, the slurry having a predetermined water to cement ratio in the range from 0.23 to 0.32. Preferably, the bubble size is in the range of 0.001" to 0.004". The small bubbles are dispersed in large quantities throughout the slurry, and due to their very small size and ability to resist collapse, they have a ball bearing effect which tends to liquefy the dry cement particles and reduce the amount of added water required to produce sufficient flowability. The size of the bubbles is less than the size of the sand particles making up the cement mix. Preferably, about 2 to 11 cu. ft. of foam is mixed with each cubic yard of cement.

Because of the reduced w/c ratio, the hardened concrete will be stronger than in the past and will have smaller air cells or voids than previous foamed concrete products. The small, durable bubbles avoid the need to mix in any of the chemicals which were necessary in the past to reduce water requirements, avoiding the disadvantages of known super-plasticizer chemicals. This technique can generally reduce water requirements of a concrete mix by 20% to 54%, providing a similar increase in concrete strength (100 p.s.i. increase in strength for each 0.01 decrease in w/c ratio).

According to another aspect of the present invention, a method of producing a foamed cement mixture is provided, which comprises the steps of preparing a foam of small bubbles of water and a predetermined foaming agent, and mixing a predetermined quantity of the foam with a liquid cement with a w/c ratio of less than 0.33.

The bubbles are durable and will withstand mixing for extended periods prior to application of the cement mixture at a job site, without collapse of significant quantities of the bubbles, so that the resultant concrete will have small air cells distributed throughout the structure.

In a preferred embodiment of the invention, the foam is formed by supplying pressurized air and a mixture of water and a foaming agent, also under pressure, into a mixing chamber. The ratio of the fluid pressure to air pressure is preferably in the range of 2 to 5:1, and a ratio of 4.6:1 was used in one embodiment. The pressurized fluid or liquid mixture is preferably injected through small nozzles into the gas flow, atomizing the fluid mixture into small droplets. The pressure ratio has been found to produce optimum atomization effects.

Concrete is formed by mixing the liquid cement paste with predetermined quantities of aggregate material. The aggregate is typically made up of medium and coarse aggregate or rock, and fine aggregate or sand. In conventional concrete, the percentage of sand in the aggregate is 30 to 40%. However, the foamed cement of this invention is preferably mixed with aggregate having a higher ratio of sand, preferably in the range of 40–50%. This reduces or eliminates voids in the concrete mixture, since gaps between larger rock particles may be filled with a combination of smaller rock, sand, and air bubbles.

According to another aspect of the present invention, a concrete structure is provided, which comprises a mass of concrete material of predetermined shape and dimensions, the concrete having a plurality of air cells distributed substantially uniformly throughout its mass, each air cell having a diameter in the range from 0.001" to 0.004".

Because of the small size of the air cells, a relatively large amount of air can be entrained in the concrete without substantially reducing the strength of the ultimate hardened structure. Additionally, since the initial foamed cement mixture used to make the concrete structure has a lower w/c ratio, the strength of the air entrained concretes end structure, without use of additional additives, is higher than was possible in the past, and the structure may be up to 5,000 p.s.i. or stronger.

In this invention, a foam of microscopic bubbles of water and a foaming agent is produced and used in a mixture with cement, where the bubbles have a ball bearing effect to liquefy the cement and reduce water requirements. The microscopic bubbles produce air cells of similarly small size in the resultant hardened concrete structure. Segregation is greatly decreased, especially in concrete where sand gradation is poor. The amount of entrained air in the concrete structure greatly improves the fire resistance performance of the product, and also results in improved acoustical abilities and sound absorption. The amount of air cells results in a very lightweight concrete and a high reduction in the volume of total materials used. Strength of the concrete structure is also increased due to the substantially reduced water to cement ratio of the concrete mix.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a schematic block diagram of a foaming apparatus producing a foam according to a first embodiment of the invention;

FIG. 2 is a pictorial view of one possible foam generating unit for the apparatus of FIG. 1;

FIG. 3 is a pictorial view of the foam and air mixing tube;

FIG. 4 is an enlarged sectional view taken on line 4—4 of FIG. 2;

DESCRIPTION OF THE PREFERRED EMBODIMENTS

Figure 8:
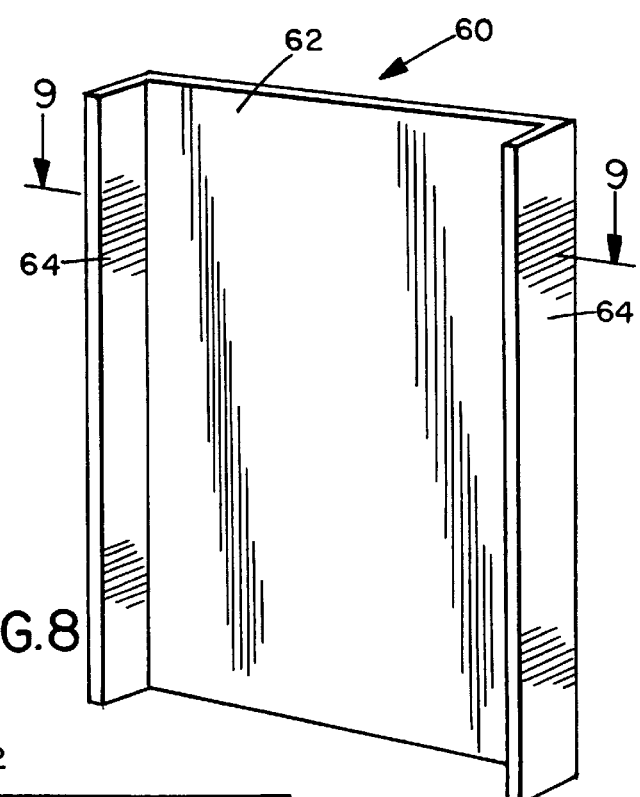
FIG. 8 illustrates a hardened concrete product made using liquid concrete with entrained air bubbles.
Figure 9:
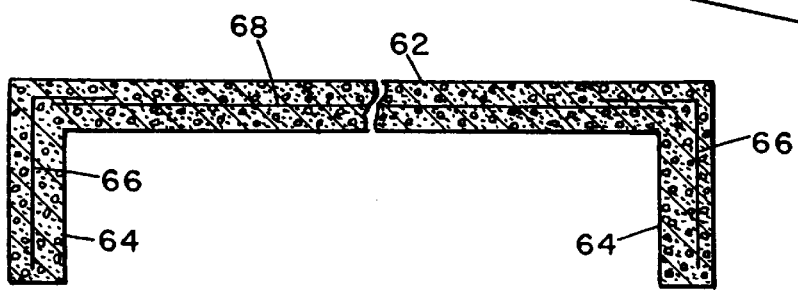
FIG. 9 is an enlarged sectional view taken on line 9—9 of FIG. 8.

FIG. 1 illustrates one possible apparatus for producing a foam according to a preferred embodiment of the present invention, while FIGS. 8 and 9 illustrate one possible product made using the foam. FIGS. 2–6 illustrate one possible foam generating unit for use in the apparatus of FIG. 1, although other foam generating units may alternatively be used. The main purpose is to produce a foam 10 of very small or microscopic, durable bubbles 12 suitable for mixing with liquid concrete material prior to placing from a concrete mixer, such that the subsequently hardened concrete will have entrained air voids. However, the foam may also be advantageously used for other purposes, such as fire extinguishing foams, mixing with pasty or high viscosity materials, such as paint, to make them more flowable for application through spray guns, and mixing with sealant materials to act as a carrying agent for such material, for example.

As best illustrated in FIG. 2, the foam generating apparatus 13 in one example comprises an elongate tubular structure having a series of three straight tubular portions or pipes 14,15,16 connected together by two pairs of direction-reversing bends or elbow fittings 17,18 and 19,20, respectively. The first straight portion 14 comprises an atomization unit with a first inlet 21 at one axial end for a gas under pressure and a second, transverse inlet 22 for receiving a mixture of water and a foaming agent. The inlets are suitably quick disconnect hose couplings, and are connected to the atomization unit via ball valves 6,8. The other tubular portions 15,16 and the connecting bends 18,19 and 20 together form a mixing chamber 23. The mixing chamber has an outlet 24 at its free end for connection to a suitable hose or tube for dispensing foam 10.

The pipes and fittings forming the tubular structure of the apparatus may be of schedule 80 P.V.C., although they may alternatively be fabricated in other materials such as brass, steel, or other suitable plastics materials or the like.

The atomization unit 14 is illustrated in more detail in FIGS. 3 and 4, and comprises an outer tube 25 and an inner tube 26 extending coaxially along the length of the outer tube up to the first elbow 17, as illustrated in dotted outline in FIG. 2. Inlet 21 is connected to the first end of the inner tube 26, as illustrated in FIG. 3, and the tube 26 has a series of openings 27 extending along its length which connect inner chamber 28 extending along the inside of tube 26 to the outer annular chamber 29 surrounding the tube. The second inlet 22 is connected to the outer chamber 29. As best illustrated in FIG. 4, the openings 27 are venturi passages. However, straight sided orifices may alternatively be used.

As schematically illustrated in FIG. 1, the water and foaming agent are mixed together in a mixing unit 30, and then pumped via pump 31 at a predetermined pressure to inlet 22. A non-vibrating pressure gauge 32 is connected to inlet 22 via a T-joint 33 so that the pressure can be monitored. A filter 34 is also provided at inlet 22 to filter any particles from the water. Water supplies at building sites are often not particularly pure and may include dirt, sand and other particles. Thus, filter 34 is designed to filter out such particles from the water. A normally closed, air-actuated shut-off valve is preferably provided in the water supply line, in order to prevent water flow and surfactant wastage when the apparatus is turned off. Optionally, a gate valve may be provided in the air supply line to direct air through a hose coupling to the inlet water hose coupling. This can be used for air flushing the unit for protection against freezing when used in a cold climate.

The mixing unit could be simply a tank filled with foaming agent to a predetermined level, with a hose supplying water to the bottom of the tank at an angle so as to produce a swirling effect. This has been found to produce thorough mixing between the water and foaming agent. A suitable gas such as air is pumped via pump 35 to inlet 21. Alternately, a jet pump could inject the foaming solution into the water flow or a separate injection pump could inject a metered amount of foaming agent into the main water flow.

An annular sealing washer or plug 36 is mounted adjacent the innermost end of the inner tube 26 so as to seal the outer chamber 29, so that the mixture of water and foaming agent under pressure is forced through openings 27 into the inner chamber 28, as indicated by the arrows in FIG. 4. This causes the mixture to atomize into small droplets which are carried along by the air flowing through chamber 28 to the opposite, open end of tube 26 at elbow 17.

Figure 5:
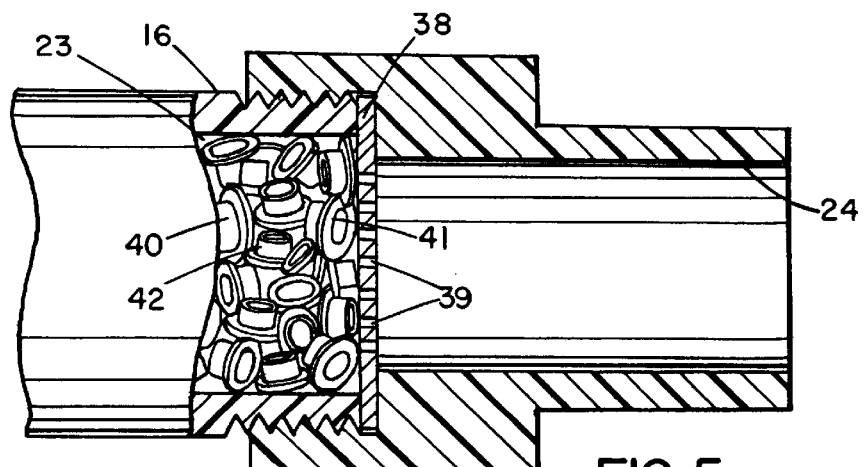
FIG. 5 is an enlarged sectional view taken on line 5—5 of FIG. 2.
Figure 6:
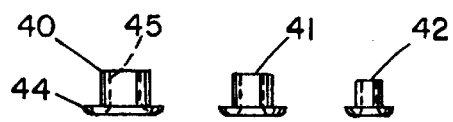
FIG. 6 illustrates the range of sizes of eyelets used in the unit.

The mixing chamber 23 is closed at each end by a sealing disc or retainer 37,38, respectively. Discs 37,38 may be identical and each have a series of small openings 39, as best illustrated in FIG. 5. The chamber is filled with a suitable agitating medium, and in the preferred embodiment the agitating medium comprises a plurality of eyelets or tubular members 40,41,42 in three or more different sizes. FIG. 6 illustrates three of the eyelets 40,41,42 of gradually reducing size. In one embodiment, the chamber 28 extending through elbow 18, straight pipe or tube 15, elbows 19,20, and straight tube 16 was packed with brass eyelets in mixed sizes from 1 to 5.

As best illustrated in FIG. 6, each eyelet is a sharp-edged tubular section with an annular rim 44 at one end, and has a through bore or passage 45. The eyelets may be of brass or other materials, and more than three different size eyelets may be used to fill chamber 23 if desired.

In one example of the apparatus of FIGS. 1–6, the straight pipe sections were each of 2" diameter pipe, while the inner pipe or tube 26 was of ¾" diameter. Inner tube 26 was fabricated in two halves, with the venturi holes drilled prior to reassembling and bonding the two pipe halves together. Alternatively the venturi orifices can be separately fabricated as inserts and installed into the pipe. The length of the first pipe section and inner tube was of the order of 14".

The ratio of liquid (water/foaming agent) pressure to air pressure supplied to inlets 22,21, respectively, is preferably in the range of 2 to 5:1. The actual pressures used will be dependent upon the required foam production rate and thus the size of the foam producing machine and its plumbing. In one example, where the foam production rate was 4 cubic foot per minute and the plumbing dimensions were as described above, the water/foaming agent mixture was preferably pressurized to a pressure of 175 p.s.i. plus or minus 25 p.s.i, and the air was supplied to inlet 21 at a pressure in the range from 38 p.s.i. plus or minus 10 p.s.i., i.e. a ratio of 4.6 to 1. By varying the geometry or quantity of the water, jet orifices of the mixing tube or the geometry or medium of the mixing chamber, pressures may vary significantly. The geometry, orifice size, and pressure relationships must be such that the foam solution is atomized into tiny droplets, to ensure formation of very fine bubbles in the foam 10. By providing a pressure ratio of 2 to 5:1, preferably 4 or 5 to 1, the aqueous foaming agent will be forced inwardly through the venturi openings 27, and will be atomized into droplets or a fine spray due to passage through the orifices or venturis. The atomized droplets are propelled by the pressurized air along the tube 26 and through the openings in end plate or retainer 37 into the mixing chamber.

In the mixing chamber 23, the droplets are forced through the multiple randomly oriented tubular openings in eyelets 40,41 and 42 with severe changes in direction, compression, expansion and violent agitation. This causes a foam to be produced which comprises fine bubbles each containing water. The density of the foam, i.e. the amount of water in a unit quantity of foam, can be varied by changing the pressures at inlets 21 and 22. The pressure ratio described above produces foam, at preferred weight of 70 grams per liter, where the mix ratio of foaming agent or surfactant to water is 1:97. The foam density may be varied by altering the mix ratio and inlet pressure ratios. Generally, lower inlet pressures produce a foam with a higher density of water.

As discussed above, one possible advantageous use for the foam produced by this apparatus is mixing with liquid concrete (cement, water and aggregate) to produce a foamed concrete material which can be pre-cast in a mold or cast on site, to produce air-entrained, lightweight concrete on drying. Where the foam is to be mixed with concrete, suitable foaming agents for mixing with water to produce the foam 10 are the foaming agent sold under the trademark MEARL FOAM™, made by Mearl Corporation of Roselle Park, N.J., Cellufoam, made by the foaming agent sold under the trademark CELLUFOAM® Corp of Ontario, Canada, the expansion material sold under the trademark ELASTIZELL®, made by Elastizell Corp. of America, Ann Arbor, Mich., the foaming agent sold under the trademark CELLUCON®, made by Romaroda Chemicals Pty. Ltd. of Victoria, Australia, the foaming agent sold under the trademark LITE-CRETE®, made by Lite-Crete, Inc. of Fresno, Calif., and similar surfactants or foaming agents used in the foaming of concrete. The preferred surfactant is the foaming agent sold under the trademark CELLUCON®, since this has been found to produce tiny, highly durable bubbles. The use of such foaming agents with the pressure differentials described above has been found to produce a thick, creamy foam of fine bubbles which are extremely resistant to collapse and are long-lasting, even when mixed with concrete for extended intervals of several hours. Since the bubbles are retained within the concrete material for longer periods of time without collapsing, they will still be present when the concrete is cast or placed. As the concrete hardens, the bubbles disintegrate or transform, releasing the water which is absorbed into the cement matrix, thus aiding in the hydration process and leaving air voids of similar sizes. Thus, there is less need to wet the concrete during curing, as is normally necessary with conventional, unfoamed concrete.

The foam 10 has an extremely fine average bubble size immediately after generation. Initially, approximately 90% of the foam volume contains a microscopic foam which looks "milky" to the unaided eye, with a few visible bubbles dispersed throughout the microscopic bubbles. Within a few minutes, if the foam is not mixed into concrete, most of the microscopic bubbles will coalesce into larger bubbles which are still very small but no longer microscopic. Testing has shown that the foam 10 in the first minute after being generated has around 60% of its volume in bubbles of diameter 0.001 to 0.004", 30% of the bubbles in the diameter range of 0.005 to 0.008" range, and 5% in the 0.010 to 0.035" range. Unless mixed into concrete, the bubbles will continue to coalesce into larger bubbles. Therefore, the foam should immediately be mixed with a liquid cement as it is generated. This may be done by inserting the nozzle of foam generating unit 13 directly into a volume of liquid cement and aggregate material.

Once mixed with the cement/aggregate material, the microscopic bubbles are strong enough to resist collapse during mixing and laying of the foamed concrete mixture. The temperature of the mixture is controlled to reduce or resist any tendency of the bubbles to expand and burst. The amount of foam mixed into the liquid cement is dependent on the amount of air which is to be entrained into the resultant concrete structure. Preferably, around 2 to 11 cu. ft. of foam is mixed into each cubic yard of concrete. The microscopic or tiny bubbles 12 will act as ball bearings to "liquefy" the dry cement particles, requiring less water to be added to the mixture to provide the necessary plasticity or flowability in the cement paste. The water to cement ratio used is preferably in the range from 0.23 to 0.32. In a conventional cement mix without air bubbles or chemical additives, a water to cement ratio of greater than 0.5 is generally required. Chemical additives do not permit a reduction below 0.3, whereas the small bubbles produced in the foam of this invention do permit water to cement ratios as low as 0.23. By reducing the water content without any chemical additives, the properties of the concrete are improved significantly.

Dry cement typically consists of very fine particles of a cement material such as Portland cement or the like. The particles may be in the form of relatively flat flakes and have a size of the order of 0.001". When mixed with water, the cement forms a paste and will act as a glue between the larger sand and rock particles. The foam of this invention allows a much smaller quantity of water to be used to wet the cement particles. It is desirable for the cement particles to be thoroughly wetted in order to form a sufficiently flowable mixture. However, in a conventional cement mixture, the relatively flat cement particles or flakes tend to stick together, reducing the surface area available for wetting. If mixed with a foam of very small bubbles of a size equivalent to that of the cement flakes, the bubbles will have a ball bearing effect and will tend to lift the cement particles away from each other, providing a larger surface area for wetting, resulting in more efficient wetting and reduced water requirements.

Aggregates used in concrete mixes generally consist of some larger or coarse rock particles, and finer sand particles of various sizes. It is generally accepted in the field that the percentage of sand particles in an aggregate mixture must be around 30% to 40% to produce high quality concrete. However, by mixing the foam of stable, small size bubbles as described above into a concrete mix of cement and aggregate, the percentage of sand used in the aggregate can be increased to 40 to 50%, and the quality of the resultant cement is less dependent on the quality of sand used than in the past.

Figure 7:
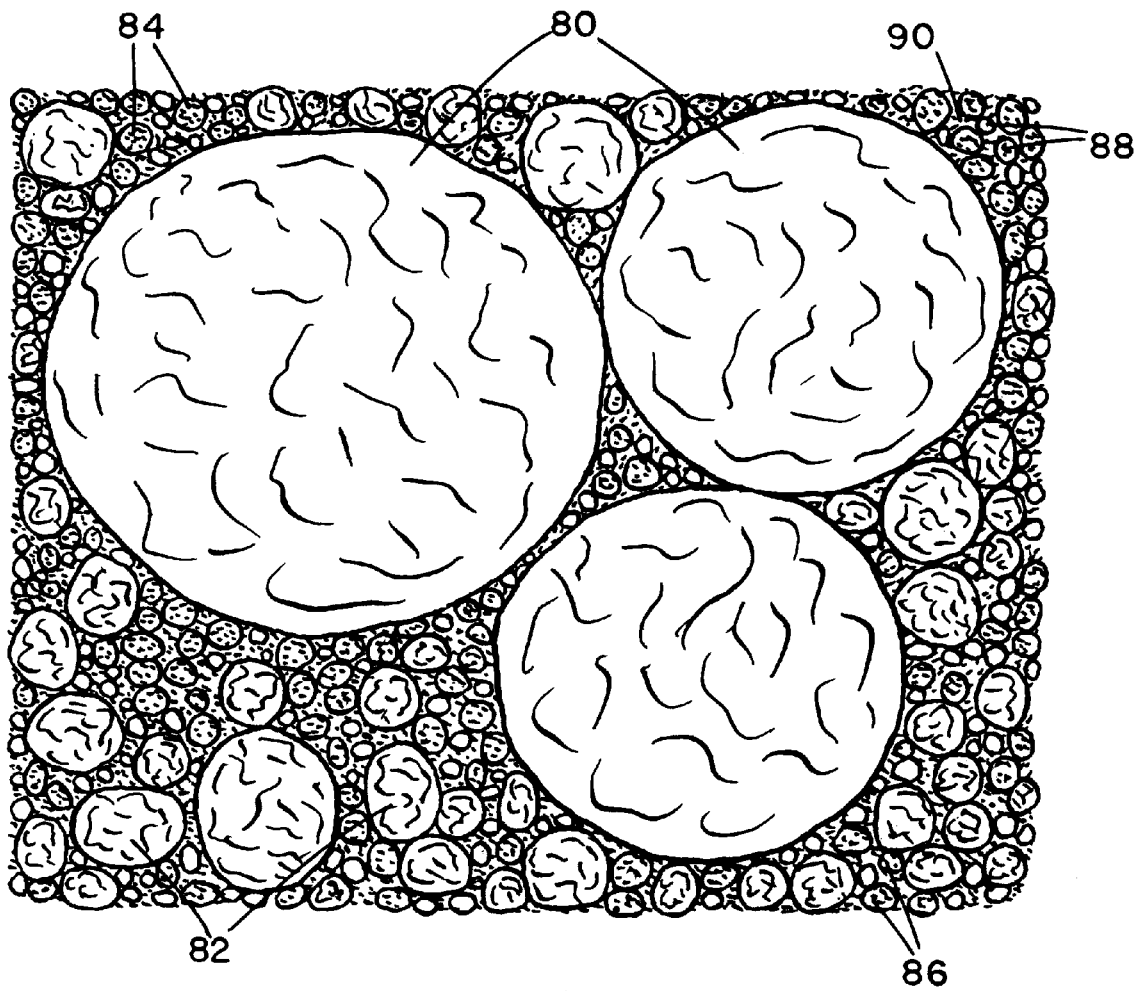
FIG. 7 is a schematic view of a liquid concrete mixture of cement, aggregate material, and foam according to a preferred embodiment of the invention.

This can be better understood with reference to FIG. 7, which is a schematic representation of a liquid concrete mixture or slurry, according to a preferred embodiment of the invention. The largest coarse rock or aggregate particles 80 are typically in a range of sizes from 1" to 2" diameter, and will form relatively large gaps or interstices which are filled with smaller particles, cement, and bubbles. The medium size coarse gravel or aggregate particles 82 are in a range of sizes from 0.25" to 0.75", and will form smaller interstices or gaps. Fine aggregate sands generally consist of a wide range of varying particle sizes, typically at least 7 particle sizes, and are indicated in FIG. 7 by large sand 84, medium sand 86, and fine sand 88, each of which may have more than one particle size according to the following ranges:

| Measurement Screen | Particle Size | Percentage | Size |
| --- | --- | --- | --- |
| No. 4 | 0.0937" | 95–100% | Large |
| No. 8 | 0.0870" | 80–100% | Large |
| No. 16 | 0.0469" | 50–85% | Medium |
| No. 30 | 0.0234" | 25–60% | Medium |
| No. 50 | 0.0117" | 10–30% | Medium |
| No. 100 | 0.0059" | 2–10% | Fine |
| No. 200 | 0.0029" | assumed 1–5% | Fine |

Thus, the concrete mixture will contain sand particles in various sizes in the range from around 0.0029" to 0.0937", and air bubbles 12 in the size range from 0.001" to 0.008". The air bubbles are therefore generally smaller than the sand particles.

In mixing cement, sand, coarse and medium aggregate, foam and water, a paste 90 of wetted cement particles, the smallest size bubbles, and the smallest size sands will be produced. This paste forms a coating around the larger size aggregates and sands, and also forms areas of solid paste in any remaining gaps in the matrix. The mixture of bubbles in the paste has a ball bearing effect, increasing flowability of the paste and allowing it to fill up any remaining gaps in the mixture more easily.

Another advantage of the very small size of the bubbles is that there will be a significant reduction in the number of bubbles which burst on mixing with the concrete mixture. The gaps formed between the larger size particles in the mixture are considerably larger than the bubble size. If the bubbles were as large as, or larger than, these gaps, they would be burst as they were squashed or compressed by the neighboring particles. The bubble size is less than the size of the gaps between the large or medium sized rock or aggregate, and will also be smaller than the size of the gaps between larger sand particles. Because of their small size, the bubbles 12 act to fill up any gaps or spaces between particles without bursting, so that a gap between three large aggregate particles will be completely filled by air bubbles 12, sands, and cement paste. The small size of the bubbles enables them to disperse more uniformly throughout the concrete mixture, forming a more uniform distribution of air cells throughout the resultant hardened concrete.

The actual mixing sequence of the foam, cement, water, coarse aggregate (rock), medium aggregate (gravel) and sand may be varied. A typical sequence would involve adding coarse and medium aggregate, cement, foam and water to the mixer, then adding sand and mixing for a short time interval before adding a second quantity of foam and mixing again. The foam acts as a plasticizer to disperse the cement paste throughout the mix.

As noted above, in prior art concrete mixtures, it was considered essential to have about 60 to 70% of rock or coarse aggregate particles in the mix, and a smaller proportion of sands. This is because the strength of the resultant concrete is largely dependent on good cement paste coverage of the surface area of all aggregates at a low w/c ratio with good flowability throughout the concrete mass. It was believed that larger quantities of small or light sand particles would reduce the good paste coverage of all aggregates due to their high surface area demands for the paste thus reducing the concrete strength. By mixing a foam of small, stable bubbles as described above into the cement mixture, the quantity of sand can be increased up to 50% without reducing the strength of the concrete. The result of the very small bubbles and the ball bearing effect they produce enables the sand particles and cement paste to be distributed throughout the mixture more uniformly than was possible in the past, at low w/c ratios while maintaining good flowability and slump.

The microscopic bubbles in the cement mixture will decrease segregation or correct deficiencies in the sand gradation, by filling up the gaps between sand and aggregate particles, as illustrated in FIG. 7. In a typical dry concrete mixture, cement, sand and gravel particles are present in a wide range of sizes, as noted above. The wide range of sizes allows all gaps to be filled with the appropriate size particles. However, if a mixture does not have the desired gradation in particle size, gaps and pathways may be present in the liquid mixture. Water can exit the mixture via such pathways, potentially causing problems such as dips in concrete floors, for example. The bubbles in the foam of this invention are small enough to fill up any such gaps or pathways, avoiding or reducing the problems of bleeding and capillary formation.

FIGS. 8 and 9 of the drawings illustrate a pre-cast concrete wall panel 60 made from a slurry of cement, aggregate and water mixed with predetermined quantities of foam. The amount of foam mixed with the slurry is sufficient to produce an air void density in the range from 20% to 40% of the total panel volume. The panel 60 has a central flat panel portion 62 and perpendicular side flanges 64, forming a channel-like structure. Reinforcing rebars 66 and mesh 68 are embedded in the concrete panel in a conventional manner, as best illustrated in FIG. 9. However, unlike conventional concrete wall panels, which must be over 7" thick to meet fire code insulation requirements, the central portion 62 of the panel has a thickness of only 4", since the air voids in the panel will provide increased insulation and allow the panel thickness to be reduced.

Due to the improved properties of the foam, which will be a dense, creamy foam of small bubbles having a relatively high surface tension, the bubbles will be strong enough to resist collapse during mixing with the slurry and injecting the foamed mixture into the mold. As the concrete hardens, the bubbles will disintegrate or transform, leaving some water which will be used for hydration during curing. This foam is capable of effectively producing air-entrained concrete with consistent air voids spread throughout the volume of the concrete structure, while previous foams used for such purposes would tend to collapse too soon and not produce an optimum air void density.

Due to the reduced weight of the concrete panel 60 with 20% to 40% air voids, as compared with a conventional concrete panel, the lower mass panel is subject to reduced seismic forces and therefore does not require as much reinforcement against such forces. A conventional concrete panel without air voids must be over 7" thick in order to meet fire code requirements and typically has a weight of around 95 lbs./sq. ft. Because of the weight of the massive wall produced with such panels, massive reinforcement structures are required to connect the panels together and to floor and ceiling structures, to reduce the risk of collapse in the event of an earthquake. In contrast, the concrete panel with air voids made using the apparatus of this invention only needs to be 4" thick in order to meet U.S. fire code requirements, and may be designed to have a weight of less than 120 lb./cu. ft. Thus, there is a major reduction in panel weight with this invention, and the reduced weight makes the panel much less sensitive to seismic forces, such that extra reinforcement is radically reduced. Construction costs using concrete panels can therefore be reduced considerably using air-entrained concrete panels manufactured using foam made by the apparatus of this invention.

The concrete slurry of FIG. 7 containing microscopic bubbles is also suitable for making other concrete structures such as floors, sidewalks, benches, and so on. The air cells entrained in the hardened concrete will be of substantially the same size as the initially formed bubbles in the foam. For structural concrete, around 20% to 40% air is preferably entrained in the concrete. However, a greater proportion of air may be entrained for other applications, for example 60 to 80% for in-fill or back-fill concrete, or for insulation purposes, simply by adding a greater quantity of foam to the cement mixture.

Where this technique is used in making a concrete structure, the concrete will be stronger due to the reduced water content in the mixture. In general, concrete strength is increased by 100 p.s.i. for each 0.01 reduction in water to cement ratio. The highly durable bubbles dispersed through the liquid concrete mixture will disintegrate or transform as the mixture hardens, leaving air cells of corresponding size dispersed substantially uniformly throughout the structure. This produces a high volume reduction, light weight concrete with improved acoustical and sound absorption qualities, as well as improved fire resistance. The concrete setting time will be faster due to the reduced water content, and the resistance of the concrete to water absorption will be increased. The foam of very small, durable bubbles avoids the limitations of prior art foams used to entrain concrete and allows a much larger percentage of the concrete volume to be replaced by air cells.

The foam of this invention has tiny, microscopic bubbles, producing a foam which is dense and creamy, and is of the consistency of a shaving cream foam from an aerosol can. The small bubbles each contain a small amount of water. The foam is suitable for many applications, but is particularly advantageous for mixing with a concrete slurry in order to make an air-entrained concrete. The bubbles have a high surface tension and do not tend to coalesce or break, even during long mixing periods. Various materials may be added to the concrete mix without depleting the foam, such as fine sand, plasticizer, accelerator, rock dust and the like. Typically, around 2–11 cu. ft. of foam will be added to each cubic yard of concrete, with the amount depending on the desired air void density and strength of the finished structure. A concrete mix made with the foam will be very workable and easy to finish. When the foam is added to the concrete slurry, the amount of water required to be mixed in with the slurry is reduced, since the bubbles will allow the cement to be sufficiently wetted with a smaller quantity of water, as explained above. The concrete produced will have less cracks, and will have low thermal conductivity, strength of 400 p.s.i. to 5,000 p.s.i. or greater and under special conditions strengths of over 7,000 p.s.i. may be obtained, and high fire resistance.

Although a preferred embodiment of the invention has been described above by way of example only, it will be understood by those skilled in the field that modifications may be made to the disclosed embodiment without departing from the scope of the present invention, which is defined by the appended claims.

We claim:

1. A foam for mixing with dry cement and other materials to increase flowability, the foam comprising:

a plurality of small bubbles formed from a mixture of water and a foaming agent in predetermined proportions, whereby each bubble contains some water;

the majority of the bubbles having a diameter in the range from 0.001" to 0.004"; and each bubble having a cell wall comprising means for resisting collapse of the bubble when mixed with another material.

2. A liquid concrete mixture, comprising:

a predetermined amount of dry cement;

a predetermined amount of water mixed with the dry cement, the water to cement ratio being in the range from 0.23 to 0.32; and a foam of small bubbles dispersed throughout the cement mixture for further liquefying the mixture;

the bubble size of at least a majority of the bubbles being in the range from 0.001" to 0.004".

3. The mixture as claimed in claim 2, wherein the quantity of foam injected into the mixture is in the range of 2 to 11 cu. ft. per cubic yard of concrete.

4. The mixture as claimed in claim 2, wherein the water to cement ratio is approximately 0.23.

5. The mixture as claimed in claim 2, wherein the foam is formed from a mixture of a predetermined surfactant and water.

6. The mixture as claimed in claim 5, wherein the water and surfactant has a mix ratio of around 97 to 1.

7. The mixture as claimed in claim 2, including a predetermined amount of aggregate, the aggregate comprising sand particles and coarse particles.

8. The mixture as claimed in claim 7, wherein the percentage of sand particles in the aggregate is in the range of 40 to 50%.

* * * * *